United States Patent [19]

Peiffer et al.

[11] Patent Number: 4,522,960
[45] Date of Patent: Jun. 11, 1985

[54] CONTROLLED GELATION ON NONAQUEOUS SOLUTIONS CONTAINING LOW CHARGE DENSITY POLYAMPHOLYTES

[75] Inventors: Dennis G. Peiffer, East Brunswick; Robert D. Lundberg, Bridgewater, both of N.J.

[73] Assignee: Exxon Research & Engineering Co., Florham Park, N.J.

[21] Appl. No.: 638,218

[22] Filed: Aug. 6, 1984

[51] Int. Cl.³ .............................................. C08L 39/00
[52] U.S. Cl. .................................... 523/339; 523/336; 524/481; 524/484; 524/516; 524/548
[58] Field of Search ............... 524/548, 516, 484, 481; 523/336, 339

[56] References Cited

U.S. PATENT DOCUMENTS

| | | | |
|---|---|---|---|
| 2,770,603 | 11/1956 | Lynch | 524/548 |
| 2,795,567 | 6/1957 | Ruehrwein | 524/548 |
| 3,423,358 | 1/1969 | Burke, Jr. | 524/548 |
| 3,700,619 | 10/1972 | Burke, Jr. | 524/548 |
| 3,836,511 | 9/1974 | O'Farrell et al. | 525/353 |
| 3,950,294 | 4/1976 | Connelly et al. | 524/577 |
| 4,076,699 | 2/1978 | Grimaud et al. | 525/333.5 |
| 4,107,132 | 8/1978 | Burke, Jr. | 524/548 |
| 4,163,740 | 8/1979 | Malassine et al. | 524/548 |
| 4,254,016 | 3/1981 | Onizawa | 524/548 |
| 4,263,419 | 4/1981 | Piestert et al. | 525/309 |

Primary Examiner—Joseph L. Schofer
Assistant Examiner—N. Sarofim
Attorney, Agent, or Firm—Richard E. Nanfeldt

[57] ABSTRACT

A process for gelling a fluid having a viscosity of at least about 50 cps which includes the steps of: forming a solvent system of the nonpolar organic liquid and a polar cosolvent, the polar cosolvent being less than about 15 weight percent of the solvent system and a viscosity of the solvent system being less than about 100 cps; dissolving a water insoluble, oil soluble terpolymer in the solvent system to form a solution, a concentration of the terpolymer in the solution being about 0.2 to about 10 weight percent and a viscosity of the solution being less than about 2000 cps, the terpolymer having the formula:

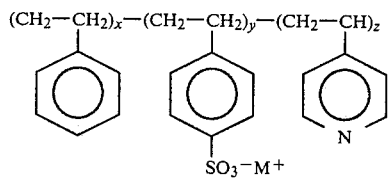

wherein x is about 40 to about 98 mole %, y is about 1 to about 50 mole %, and z is about 1 to about 50 mole %, wherein y and z are less than 60 mole %, and M is an amine or a metal cation selected from the group consisting of antimony tin, lead, Groups IA, IIA, IB and IIB of the Periodic Table of Elements; and adding about 5 to about 500 volume percent water to the solution of the terpolymer, said water being immiscible with the solution of the terpolymer, the polar cosolvent transferring from the nonpolar organic liquid to the water thereby causing the viscosity of the organic liquid to increase to at least 5000 cps.

12 Claims, 2 Drawing Figures

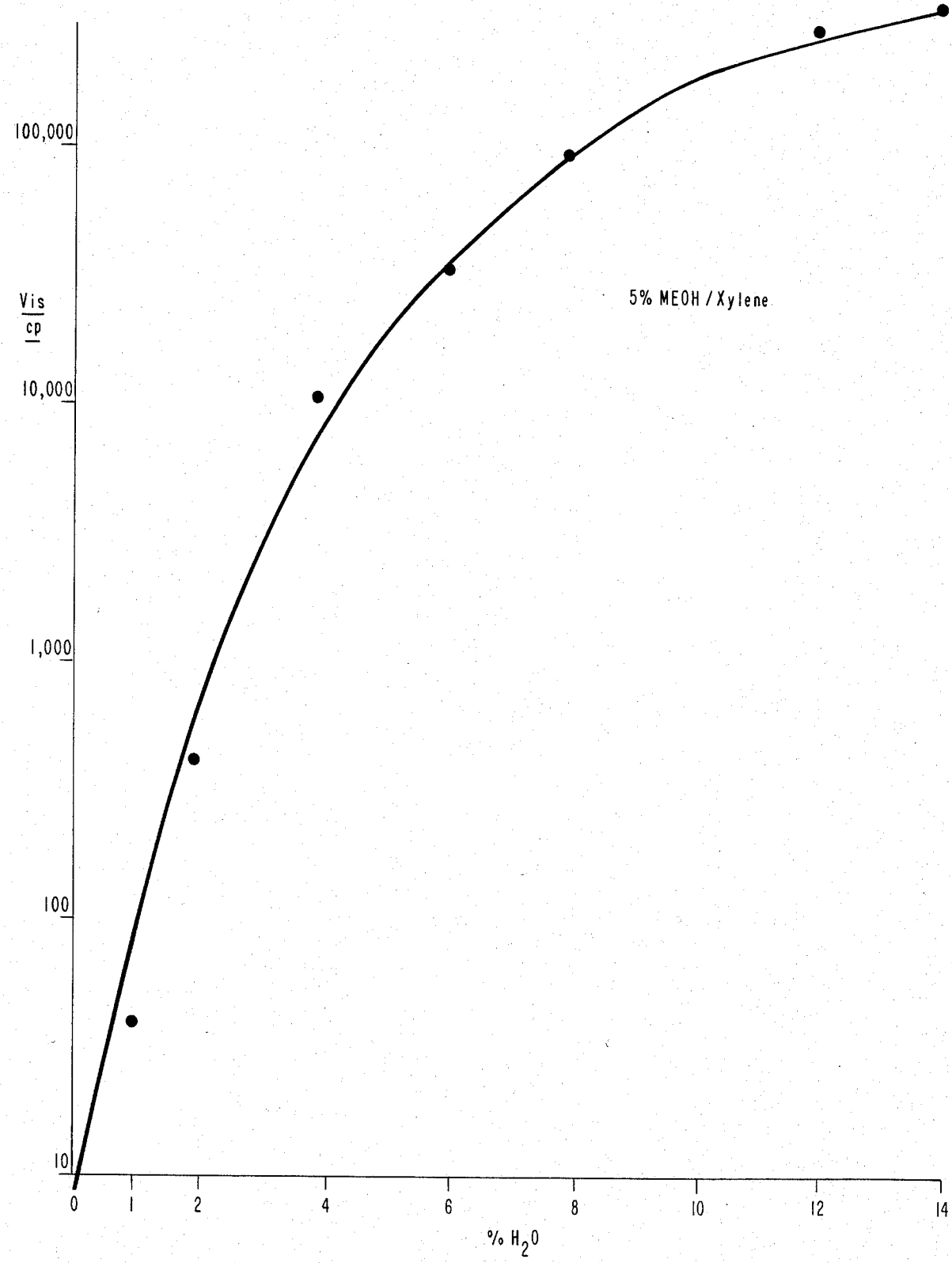
FIG. 2 — EFFECT OF WATER ADDITION TO 5% CONC. SOLUTIONS OF 2 MOLE % SPS ON BROOKFIELD VISCOSITY

4,522,960

CONTROLLED GELATION ON NONAQUEOUS SOLUTIONS CONTAINING LOW CHARGE DENSITY POLYAMPHOLYTES

BACKGROUND OF THE INVENTION

1. Field of the Invention

The present invention relates to a process for the gelation of hydrocarbon organic liquid or oil which includes the step of adding a polyampholyte to a nonpolar organic liquid or oil thereby causing gelation of the hydrocarbon organic liquid or oil.

2. Description of the Prior Art

There are many applications for very viscous or gelled solutions which are quite diverse. There are also a number of physical and chemical techniques for preparing such systems. The present invention is concerned with a process for gelling a nonpolar organic fluid system by adding a polyampholyte to the fluid system having a relatively low viscosity. The potential applications for this process and the products derived therefrom will be evident in the instant application. Some of these applications are as a viscosifier for hydrocarbon solutions, such as a shut-off process in grouting operations, a water shut-off technique in oil well applications and a spacer or soluble plug in oil well applications.

The instant invention differs from a number of applications, Ser. Nos. 223,482, now U.S. Pat. No. 4,361,658; 136,837, now U.S. Pat. No. 4,322,329; and 106,027, now U.S. Pat. No. 4,282,130, filed by Robert Lundberg et al, one of the instant inventors. These previously filed applications were directed to the gelling of the organic liquid by a water insoluble, neutralized sulfonated polymer whereas the instant invention is directed to the gelling of an organic fluid of a polyampholyte.

In a subsequent invention (U.S. Ser. No. 547,955, filed Nov. 2, 1982) two polymers are mixed to produce an interpolymer complex which at relatively low concentration forms a three-dimensional network with a gel-like behavior. Interpolymer complexes are much more effective in forming a network than are single associating polymers leading to gels of higher strength.

In U.S. Ser. No. 547,955 the interpolymer complexes in hydrocarbon solutions are obtained by mixing two polymers which are strongly associated with each other. One polymer will contain anionic groups along or pendant to its backbone, and the other polymer will contain cationic groups. The coulombic interaction between cationic and anionic groups leads to network formation, if each chain contains interacting groups in multiple locations.

In the instant invention, low charge density polyampholytes in nonaqueous solutions are formed by sulfonation of a preformed base-containing copolymer, such as styrene-4 vinylpyridine. In a polyampholyte, the cationic and anionic moieties are located on the same chain backbone, i.e., sulfonate and 4-vinylpyridine units, interact very strongly with each other. Therefore, these polyampholytes strongly interact with each other forming a tight networks, i.e. gel, since each chain contains interacting groups in multiple locations. The gel structure, to a first approximation, is more tightly bound than its low charge density sulfonate ionomer counterpart and more importantly, the properties of these gels are improved over the interpolymer complexes. Even more important, these polyampholytic gel systems are formed without having to mix oppositely-charged copolymers as taught in U.S. Ser. No. 547,955.

A solution of a polyampholyte in the presence of a cosolvent will have a relatively low viscosity. Gelation of this solution will be affected by removing the cosolvent. Such removal can be obtained by selective extraction, evaporation of a volatile cosolvent, chemical reaction, precipitation, absorption, or any other method that would shift the balance from the state of attraction to the polymer functional group to another preferred state.

A simple means for extraction of a polar cosolvent is the addition of water or a second polar fluid to the solution. If the second fluid is not miscible with the primary solvent, an extraction of the solar cosolvent will take place into the second phase. The new equilibrium will be a function of the volume of each phase as well as temperature and pressure conditions. Equilibrium can be further shifted by adding an absorbing or reacting species to the extracting phase.

SUMMARY OF THE INVENTION

The present invention relates to a process for the viscosification of a nonpolar organic liquid which includes the steps of forming a solvent system of a nonpolar organic liquid or oil and a polar cosolvent, the polar cosolvent being less than about 15 weight percent of the solvent systems, a viscosity of the solvent systems being less than about 1,000 cps; dissolving a polyampholyte in the solvent systems to form a solution, and removing the polar cosolvent from the solution of the nonpolar organic liquid, polar cosolvent, and the polyampholyte to cause gelation of the hydrocarbon organic liquid and the polyampholyte. A means of removing the polar cosolvent from and solution of the nonpolar organic liquid, polar cosolvent and polyampholyte comprises contacting or admixing the solution with about 5 to about 500 volume percent water, the water being immiscible with the nonpolar organic liquid and the polar cosolvent transferring from the nonpolar organic liquid to the water phase, thereby causing the polymer containing phase to gel (i.e. thicken).

Accordingly, it is a primary object of the instant thickness to describe an economical process for forming a highly viscous or gelled polymer solution of a nonpolar hydrocarbon liquid having a viscosity greater than about 50,000 cps preferably greater than about 500,000 cps.

A further object of the instant invention is to provide a process for forming a gel solution which can be used as a viscosifier.

A still further object of the instant invention is to employ the instant process as an integral part of well control procedures such as enhanced oil recovery, water shut-off means, viscous foams, and spacers and soluble plugs.

GENERAL DESCRIPTION

The present invention relates to a process for the gelling of a hydrocarbon organic liquid which includes the steps of forming a solvent system of an organic liquid or oil and a polar cosolvent, the polar cosolvent being less than about 15 weight percent of the solvent systems, a viscosity of solvent systems being less than about 1,000 cps; dissolving a polyampholyte in the solvent systems to form a solution, and removing the polar cosolvent from the solution of the nonpolar organic liquid, polar cosolvent, and the polyampholyte to cause gelation of the nonpolar organic liquid and the polyampholyte. A means of removing said polar cosolvent from the solution of nonpolar organic liquid, polar cosolvent and polyampholyte comprises contacting or admixing said solution with about 5 to about 500 volume percent water, the water being immiscible with the organic liquid and the polar cosolvent transferring from the organic liquid to the water phase, thereby causing the polymer containing phase to gel (i.e. thicken).

The gelled polymer solution having a viscosity greater than 50,000 cps is formed by the addition of water to the polymer solution which comprises a water insoluble, oil soluble polyampholyte, a nonpolar organic liquid and a polar cosolvent, wherein the solution has a viscosity less than 2,000 cps. The concentration of polyampholyte in the solution is 0.1 to 20 weight percent, more preferably about 0.2 to 10 and most preferably about 0.5 to about 5. Upon the addition of water to the solution of the polyampholyte, the polar cosolvent rapidly transfers from the solution to the aqueous phase causing immediate gelation of the hydrocarbon liquid. The water can be removed by conventional liquid extraction methods.

The component materials of the instant process generally include a water insoluble, oil soluble polyampholyte at a concentration level of 0.1 to 20 weight percent more preferably about 0.2 to about 10, and most preferably about 0.5 to about 5, a nonpolar hydrocarbon organic liquid, polar cosolvent and water.

The polyampholytes of the instant invention are terpolymers of a nonionic monomer, a sulfonate containing monomer and an amine containing monomer. The terpolymers of the instant invention are formed by a free radical emulsion polymerization of the amine containing monomer and the nonionic monomer to form a copolymer of the nonionic monomer and the amine containing monomer. This copolymer is subsequently sulfonated according to the procedures of U.S. Pat. No. 3,836,511, which is hereby incorporated by reference, to form the terpolymer of the nonionic monomer, the sulfonate containing monomer and the amine containing monomer.

A suitable oil soluble and water insoluble terpolymer of the instant invention is styrene/metal styrene sulfonate/vinyl pyridine which has the formula:

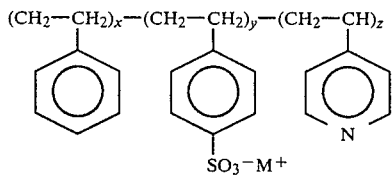

wherein x is about 40 to about 98 mole %, more preferably about 50 to about 95 mole %, and most preferably about 80 to about 99, y is about 1 to about 50 mole %, more preferably about 2 to about 20 mole %, and most preferably about 2 to about 10 mole %, and z is about 1 to about 50 mole %, more preferably about 1 to about 10, and most preferably about 2 to about 10, wherein y and z are less than 60 mole %, and M is an amine or a metal cation selected from the group consisting of antimony tin, lead, Groups IA, IIA, IB and IIB of the Periodic Table of Elements.

The molecular weight, as derived from intrinsic viscosities, for the terpolymers of styrene/metal styrene sulfonate/vinyl pyridine is about $1 \times 10^3$ to about $5 \times 10^7$, more preferably about $1 \times 10^4$ to about $2 \times 10^6$ and most preferably about $1 \times 10^5$ to about $1 \times 10^6$. The means for determining the molecular weights of the oil soluble and water insoluble terpolymers is from the viscosity of solutions of the terpolymers comprises the initial isolation of the hydrocarbon soluble terpolymers, purification and redissolving the terpolymers in a nonaqueous solvent to give solutions with known concentrations. The flow times o the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the wellknown Mark Houwink relationship.

The sytrene/vinyl pyridine copolymer is formed by free radical emulsion copolymerization using techniques well-known in the polymer literature. Such polymers can be prepared by reacting the amine containing monomer (vinyl pyridine/styrene) with a monomer selected from the group consisting of styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The vinyl pyridine content of the preferred copolymer of styrene and vinyl pyridine is about 1 to about 50 mole percent, more preferably about 2 to about 20 mole percent and most preferably about 2 to about 10 mole percent. The number average molecular weight as measured by GPC is about 10,000 to about 10,000,000, preferably about 20,000 to about 5,000,000 and most preferably about 30,000 to about 2,000,000.

The amine-containing copolymer has typically a polymeric backbone where the nitrogen elements are in the chain or pendant to it. Such a polymer may be obtained by direct copolymerization of a monomer containing the basic moiety with other monomers, or by grafting a monomer containing the basic moiety on to a polymerized chain. Monomers can be chosen from vinyl monomers leading to hydrocarbon soluble polymers such as styrene, t-butyl styrene, acrylonitrile, isoprene, butadiene, acrylates, methacrylates and vinyl acetate. Monomers containing a basic moiety will be those who contain amine or alkyl amine groups or pyridine groups, such as vinyl pyridine.

The amount of vinyl pyridine in the amine-containing copolymer can vary widely, but should range from about 00.1 weight percent to about 10 weight percent.

Preferably, the amine content in the amine-containing copolymer is expressed in terms of basic nitrogen. In this respect, the nitrogen content in amides and similar nonbasic nitrogen functionality is not part of the interacting species.

A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred.

The amine-containing copolymer of styrene and vinyl pyridine is sulfonated according to the procedure of U.S. Pat. No. 3,836,511 which is herein incorporated by reference to form the terpolymer of styrene/styrene sulfonic acid/vinyl pyridine which is subsequently neutralized with an amine or metal cation to form the terpolymer of styrene/neutralized styrene sulfonate/vinyl pyridine.

The number of sulfonate groups contained in the terpolymer is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. An alternate way of expressing this is to state the sulfonate level in terms of milliequivalents (meq.) of sulfonic acid groups per 100 gms of polymer. This latter procedure provides a rapid and independent measure of sulfonic acid content in a polymer through simple titration.

Both mole percent sulfonate and milliequivalent of sulfonate will be employed to describe the sulfonate polymers employed in this invention. In general, the terpolymer will comprise from about 1 meq. up to 500 meq. of sulfonate groups per 100 g. of polymer, more preferably about 10 meq. to about 100 meq. of sulfonate groups. The unneutralized sulfonate terpolymers in the instant invention are neutralized with the basic materials selected from the group consisting of an amine or a metal cation of Groups IA, IIA, IB and IIB of the Periodic Table of the Elements and lead, tin and antimony. A preferred counterion for this invention is zinc, as explained below.

Neutralization of the unneutralized sulfonated terpolymers with appropriate metal hydroxides, metal acetates, metal oxides, etc. can be conducted by means well-known in the art. For example, the sulfonation process of the copolymer containing a small 0.3 to 1.0 mole% unsaturation, can be conducted in a suitable solvent such as 1,2-dichloroethine with acetyl sulfate as the sulfonating agent. The resulting sulfonic acid derivative can then be neutralized with a number of different neutralization agents such as sodium phenolate and similar metal salts. The amounts of such neutralization agents employed will normally be stoichiometrically equal or in some excess to the amount of free acid in the polymer plus any unreacted reagent which still is present. It is preferred that the amount of neutralizing agent be equal to the molar amount of sulfonating agent originally employed plus 10% more to ensure full neutralization. The use of more of such neutralization agent is not critical. Sufficient neutralization agent is necessary to affect at least 50% neutralization of the sulfonic acid groups present in the polymer, preferably at least 90%, and most preferably essentially complete neutralization of such acid groups should be affected.

The degree of neutralization of said sulfonate groups may vary from 50 to 500 mole%, preferably 90 to 200%. It is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

We have surprisingly found that a very important factor in determining the strength of the interaction between the sulfonate groups amine-containing groups in the terpolymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: "Chemical Principles and Properties", by M. J. Sienko and R. A. Plane, McGraw Hill Book Co., 1974, page 19). These metal cations are best exemplified by zinc and interact strongly with pyridine and similar amines. As a consequence, a zinc neutralized sulfonate groups interacts much more strongly with the vinyl pyridine in the terpolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free sulfonic acid of the terpolymer, which will also interact with the vinyl pyridine. In this latter case, it is clear that the interaction is a classic acid-base interaction, while with the transition metals, a true coordination complex is created, which is due to the donation of the electron pair of the nitrogen element. This distinction is a very important one and sets these polyampholytes apart from classic acid-base interactions. The surprising observation is that such coordination complexes can form in such extreme dilution insofar as interacting groups are concerned, and that they are apparently formed so far removed from their expected stoichiometry, (based on small molecule analogs). Therefore, only those polymer backbones (i.e., as measured in the absence of ionic groups) having a solubility parameter less than 10.5 are suitable in this invention.

The organic liquids, which may be utilized in the instant invention, are selected with relation to the anionic and cationic moities of the polyampholyte and vice-versa. The organic liquid is selected from the group consisting of aromatic hydrocarbons, cyclic aliphatic ethers, aliphatic ethers, or organic aliphatic esters and mixtures thereof.

Specific examples of organic liquids to be employed with the various types of polymers are:

| Polymer | Organic Liquid |
| --- | --- |
| sulfonated polystyrene | benzene, toluene, ethyl benzene, methylethyl ketone, xylene, styrene, ethylenedichloride, methylene chloride. |
| sulfonated poly-t-butyl-styrene | benzene, toluene, xylene, ethyl benzene, styrene, t-butyl styrene, aliphatic oils, aromatic oils, hexane, heptane, decane, nonane. |
| sulfonated ethylene-propylene terpolymer | pentane, aliphatic and aromatic solvents, oils such as Solvene "100 Neutral", 150 Neutral" and similar oils, benzene diesel oil, toluene, xylene, ethyl benzene, pentane, hexane, heptane, octane, isooctane, nonane, decane aromatic solvents, ketone solvents. |
| sulfonated styrene-methyl methacrylate copolymer | dioxane, halogenated aliphatics, e.g., methylene chloride, tetrahydrofuran. |
| sulfonated polyisobutylene | saturated aliphatic hydrocarbons, diiso- |

| Polymer | Organic Liquid |
| --- | --- |
| | butylene, triisobutylene, aromatic and alkyl substituted aromatic hydrocarbons, chlorinated hydrocarbons, n-butyl ether, n-amyl, ether, methyl oleate, aliphatic oils, oils predominantly paraffinic in nature and mixtures containing napthenic hydrocarbons. "Solvent 100 Neutral", "Solvent 150 Neutral", and all related oils, low molecular weight polymeric oils such as squalene, white oils and process oils having 60 percent or less aromatic content. |
| sulfonated polyvinyl toluene | toluene, benzene, xylene, cyclohexane, ethyl benzene, styrene, methylene chloride, ethylene dichloride. |
| vinyl pyridine with styrene or t-butyl styrene | benzene, toluene, xylene, ethyl benzene, styrene, t-butyl styrene, aliphatic oils, aromatic oils, hexane, heptane, decane, nonane. |

The method of the instant invention includes incorporating a polar cosolvent, for example, an alcohol, in the solution of the nonpolar organic liquid and a water insoluble, oil insoluble polyampholyte to solubilize the pendant sulfonate groups. The polar cosolvent will have a solubility parameter of at least 10.0, more preferably at least 11.0 and is water miscible the polar solvent comprises from 0.1 to 15.0 weight percent, more preferably 0.1 to 5.0 weight percent of the total mixture of the nonpolar organic liquid, water insoluble and oil soluble polyampholyte and polar cosolvent. The solvent system of polar cosolvent and organic liquid in which the water insoluble, oil soluble polyampholyte is dissolved contains less than about 10 weight percent of the polar cosolvent, more preferably about 0.1 to about 5.0 weight percent, and most preferably about 0.1 to about 5.0 weight percent. The viscosity of the solvent system measured at room temperature is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting of water soluble alcohols, amines, di- or trifunctional alcohols, amides, acetamides, phosphates, or lactones and mixtures thereof. Especially preferred polar cosolvents are aliphatic alcohols having about 1 to about 10 carbon atoms such as methanol, ethanol, n-propanol, isopropanol, 1,2-propane diol, monoethyl ether of ethylene glycol, and n-ethylformamide.

The amount of water added to the solution of water insoluble, oil soluble polyampholyte, organic liquid and polar cosolvent having a viscosity of less than about 2,000 cps, is about 5 to about 500 volume percent of water, more preferably about 10 to about 300 volume percent water, most preferably about 10 to about 200 volume percent water.

DETAILED DESCRIPTION OF THE PREFERRED EMBODIMENT

Figure 1:
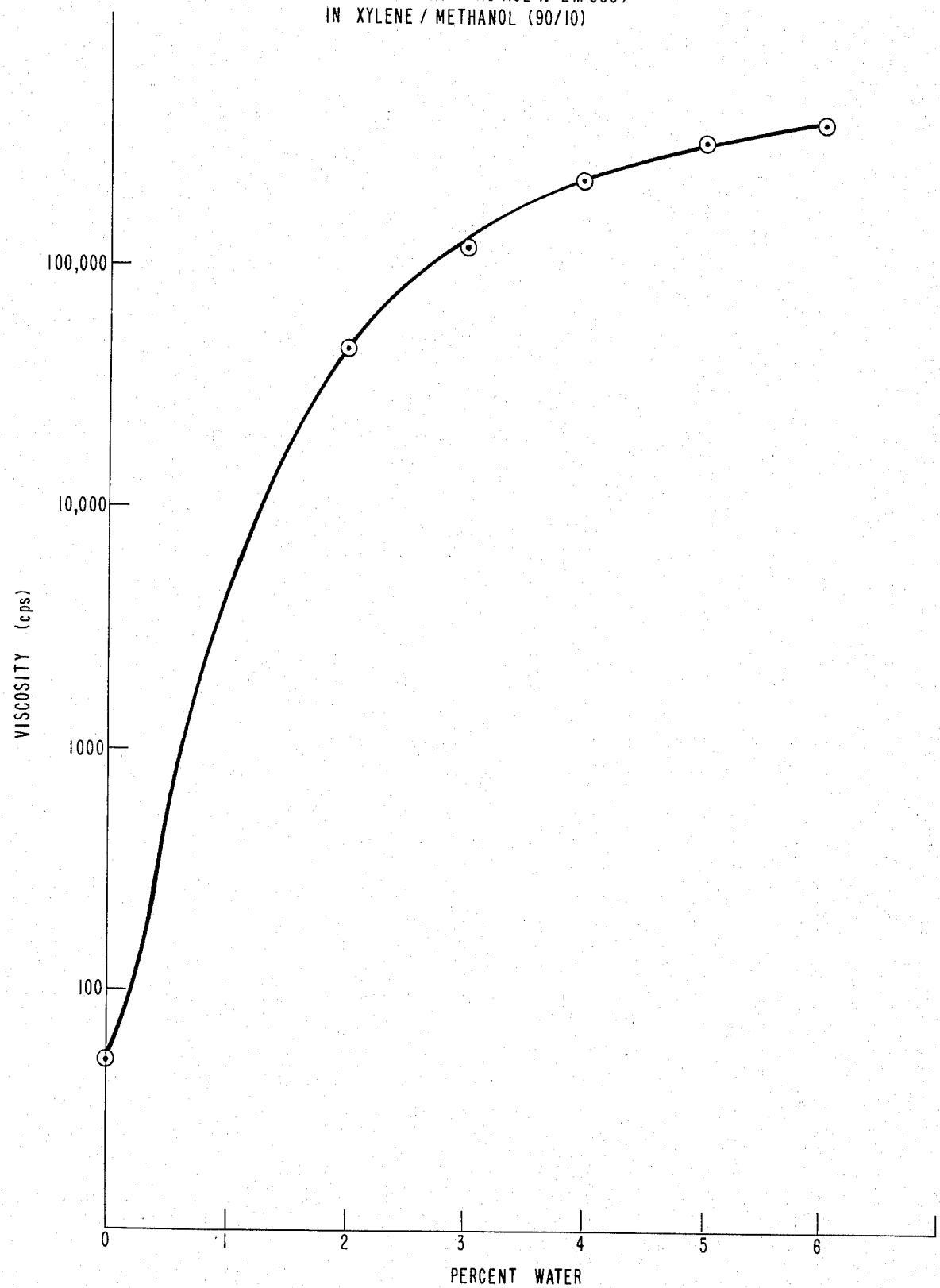

The following examples illustrate the present invention, without; however, limiting the same hereto.

EXAMPLE 1

A representative example for the synthesis of the styrene-4 vinyl pyridine copolymer which is subsequently sulfonated is described below.

Into a 1 liter, 4 neck flask, was added:
50 g styrene
3.2 g sodium lauryl sulfate
120 ml distilled water
0.2 g potassium persulfate
0.05 g dodecylthiol
1.1 g 4-vinyl pyridine The solution was purged with nitrogen gas for one hour to remove dissolved oxygen. As the nitrogen gas purging began, the solution was heated to 50° C. After 24 hours, the polymer was precipitated from solution with a large excess of acetone. Subsequently, the polymer was washed with acetone and dried in a vacuum oven at 60° C. for 24 hours. Elemental analysis showed that the copolymer contained 2.5 mole % 4-vinyl pyridine.

EXAMPLE 2

A representative example for the sulfonation of the styrene-4 vinyl pyridine copolymer is described below. It is noted that this sulfonation route is described in U.S. Pat. No. 3,870,841 (1975 to Exxon Research and Engineering Company).

The following procedure was generally followed: 50 g the copolymer of styrene/4-vinyl pyridine was dissolved in 500 ml of 1,2-dichloroethane. The solution was heated to 50° C., and the requisite amount of acetyl sulfate was added, in this case, 34.6 ml of 0.996M acetyl sulfate (24.5 meq.). The solution was stirred for 60 minutes at 50° C., and the reaction was terminated by the addition of 40 ml of methanol. Sufficient zinc acetate (diluted with methanol) was added to neutralize all acid present. The polymer solution was precipitated into a substantial excess of methanol with vigorous agitation, followed by filtration and washing with methanol. The product was then vacuum dried. Analyses were conducted for sulfur and sodium. The level of sulfonate incorporated was determined by sulfur analysis.

Elemental analysis shows that 1.6 mole% sulfonate groups was incorporated into the polymer chain structure.

EXAMPLE 3

The polyampholyte synthesized in examples 1 and 2 was dissolved in xylene/methanol (90/10 ratio by weight) at a concentration of 5% by weight.

Various amounts of water were added to this solution and the results are presented in FIG. 1 where the viscosity of the resultant gel is plotted as a function of the added cosolvent (water). It is readily apparent that as more alcohol is dissolved into the aqueous phase, the higher the gel strength becomes. Moreover, these viscosity values are significantly higher than that observed for the homogeneously-charged sulfonated ionomers at comparable added increments of water. The latter results are shown in FIG. 2.

What is claimed is:

1. A process for gelling a nonpolar organic liquid having a viscosity of at least about 50 cps which includes the steps of:
   (a) forming a solvent system of said nonpolar organic liquid and a polar cosolvent, said polar cosolvent being less than about 15 weight percent of said solvent system and a viscosity of said solvent system being less than about 100 cps;
   (b) dissolving a water insoluble, oil soluble terpolymer in said solvent system to form a solution, a concentration of said terpolymer in said solution being about 0.2 to about 10 weight percent and a viscosity of said solution being less than about 2000 cps, said terpolymer having the formula:

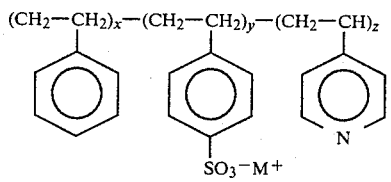

wherein x is about 40 to about 98 mole %, y is about 1 to about 50 mole %, and z is about 1 to about 50 mole %, wherein y and z are less than 60 mole %, and M is an amine or a metal cation selected from the group consisting of antimony tin, lead, Groups IA, IIA, IB and IIB of the Periodic Table of Elements; and
   (c) adding about 5 to about 500 volume percent water to said solution of said terpolymer, said water being immiscible with said solution of said terpolymer, said polar cosolvent transferring from said nonpolar organic liquid to said water thereby causing the viscosity of said organic liquid to increase to at least 5000 cps.

2. A process according to claim 1 further including a means for removing said water from said gelled organic liquid.

3. A process according to claim 1, wherein said terpolymer has about 1 to about 500 meq. of sulfonate groups per 100 grams of said terpolymer.

4. A process according to claim 3 wherein said sulfonate groups are at least 90 mole percent neutralized.

5. A process according to claim 1 wherein said polar cosolvent has a greater polarity than said nonpolar organic liquid.

6. A process according to claim 1 wherein said polar cosolvent is selected from the group consisting of aliphatic alcohols, aliphatic amines, di- or trifunctional aliphatic alcohols, water miscible amides, acetamides, phosphates, and lactones and mixtures thereof.

7. A process according to claim 1 wherein said polar cosolvent is selected from the group consisting of methanol, ethanol, propanol, and isopropanol and mixtures thereof.

8. A process according to claim 1 wherein said polar cosolvent has a solubility parameter of at least about 10 and is water miscible.

9. A process according to claim 1 wherein said organic liquid is selected from the group consisting of aromatic hydrocarbons, chlorinated aliphatic hydrocarbons, and aliphatic hydrocarbons, and mixtures thereof.

10. A process according to claim 1 wherein said organic liquid is selected from the group consisting of aliphatic hydrocarbons and aromatic hydrocarbons.

11. A process according to claim 1 wherein said organic liquid is selected from the group consisting of benzene, toluene, ethyl benzene, xylene and styrene and mixtures thereof.

12. A gel of a nonpolar organic liquid and a terpolymer having the formula:

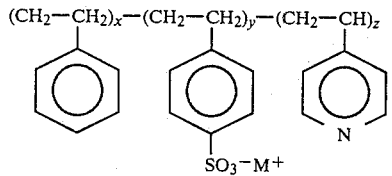

wherein x is about 40 to about 98 mole %, y is about 1 to about 50 mole %, and z is about 1 to about 50 mole %, wherein y and z are less than 60 mole %, and M is an amine or a metal cation selected from the group consisting of antimony tin, lead, Groups IA, IIA, IB and IIB of the Periodic Table of Elements.

* * * * *